US008281290B2

(12) United States Patent
Thompson

(10) Patent No.: US 8,281,290 B2
(45) Date of Patent: Oct. 2, 2012

(54) SOFTWARE DIVERSITY USING CONTEXT-FREE GRAMMAR TRANSFORMATIONS

(75) Inventor: Gerald R. Thompson, Somerset, NJ (US)

(73) Assignee: Alcatel Lucent, Paris (FR)

( * ) Notice: Subject to any disclaimer, the term of this patent is extended or adjusted under 35 U.S.C. 154(b) by 1258 days.

(21) Appl. No.: 12/010,925

(22) Filed: Jan. 31, 2008

(65) Prior Publication Data

US 2008/0320452 A1    Dec. 25, 2008

Related U.S. Application Data

(60) Provisional application No. 60/936,842, filed on Jun. 22, 2007.

(51) Int. Cl.
*G06F 9/45* (2006.01)

(52) U.S. Cl. ........ 717/143; 717/140; 717/146; 717/155; 717/157

(58) Field of Classification Search .................. None
See application file for complete search history.

(56) References Cited

U.S. PATENT DOCUMENTS

| | | | | |
|---|---|---|---|---|
| 5,481,708 A * | 1/1996 | Kukol | .......................... | 717/155 |
| 5,535,391 A * | 7/1996 | Hejlsberg et al. | .............. | 717/140 |
| 5,790,867 A * | 8/1998 | Schmidt et al. | ............... | 717/155 |
| 5,937,196 A * | 8/1999 | Schmidt et al. | ............... | 717/155 |
| 6,072,951 A * | 6/2000 | Donovan et al. | .............. | 717/158 |
| 6,327,699 B1 * | 12/2001 | Larus et al. | ................... | 717/128 |
| 6,378,126 B2 * | 4/2002 | Tang | ............................. | 717/143 |
| 6,895,580 B2 * | 5/2005 | Bates et al. | ................... | 717/157 |
| 6,971,092 B1 * | 11/2005 | Chilimbi | ....................... | 717/158 |
| 7,254,809 B2 * | 8/2007 | Kurhekar et al. | ............. | 717/146 |
| 7,289,948 B1 * | 10/2007 | Mohri | ............................ | 704/9 |
| 7,665,063 B1 * | 2/2010 | Hofmann et al. | ............. | 717/111 |
| 7,805,714 B2 * | 9/2010 | Waddington et al. | ......... | 717/143 |
| 2003/0056083 A1 * | 3/2003 | Bates et al. | ..................... | 712/20 |
| 2005/0091644 A1 * | 4/2005 | Chilimbi | ....................... | 717/128 |
| 2006/0117307 A1 * | 6/2006 | Averbuch et al. | ............. | 717/143 |
| 2006/0143688 A1 * | 6/2006 | Futoransky et al. | ............. | 726/1 |
| 2006/0155526 A1 * | 7/2006 | Castillo et al. | ................... | 704/1 |
| 2006/0230378 A1 * | 10/2006 | Waddington et al. | ......... | 717/100 |
| 2006/0230453 A1 * | 10/2006 | Flynn et al. | ..................... | 726/24 |

OTHER PUBLICATIONS

Mehryar Mohri, Regular Approximation of Context-Free Grammars Through Transformation, Kluwer Academic Publishers, 2000, pp. 251-261, <https://drona.csa.iisc.ernet.in/~deepakd/atc-common/RegApprox.pdf>.*

Mark-Jan Nederhof, Practical Experiments with Regular Approximation of Context-Free Languages, 2000 Association for Computational Linguistics, 28 pages, <http://dl.acm.org/citation.cfm?id=971843>.*

(Continued)

*Primary Examiner* — Thuy Dao
*Assistant Examiner* — Cuong V Luu
(74) *Attorney, Agent, or Firm* — Harness, Dickey & Pierce, P.L.C

(57) ABSTRACT

A method may include mapping a first program to a context-free grammar. Grammar transformations may be performed on the context-free grammar to produce a transformed context-free grammar representing the first program. A second program having a program structure different than a program structure of the first program may be constructed from the transformed context-free grammar.

13 Claims, 6 Drawing Sheets

OTHER PUBLICATIONS

En-hui Yang, Efficient Universal Lossless Data Compression Algorithms Based on a Greedy Sequential Grammar Transform-Part Two: With Context Models, 2003 IEEE, <http://ieeexplore.ieee.org/stamp/stamp.jsp?tp=&arnumber=1246012>.*

Hu Li, Test Criteria for Context-free Grammars, 2004 IEEE, 6 pages, <http://ieeexplore.ieee.org/stamp/stamp.jsp?tp=&arnumber=1342847>.*

Luigi Petrone, Syntax Directed Mappings of Context—Free Languages, 1968 IEEEpp. 160-175, <http://ieeexplore.ieee.org/stamp/stamp.jsp?tp=&arnumber=4569566>.*

Yoshihiro Adachi, A Context-Sensitive NCE Graph Grammar and its Parsability, 2000 IEEE, pp. 111-118, <http://ieeexplore.ieee.org/stamp/stamp.jsp?tp=&arnumber=874374>.*

* cited by examiner

FIG. 2

$N.\Gamma = \text{Nonterms}(\Pi)$
$T.\Gamma = L.\Pi$
$s.\Gamma = s.\Pi$
$F.\Gamma = \text{Paths}(\Pi)$
$F.\Gamma = F.\Pi$
$B.\Gamma = B.\Pi$
$D.\Gamma = D.\Pi$
$\tau.\Gamma = \text{Assign}(\Pi)$ Let $\zeta(l) = n_l$ if for $(l, l, n, \rho, \chi) \in B$ $n \neq \varepsilon$, or $l$ otherwise.
Let $\eta(l) = $ a unique name for $l$ denoted $\eta_l$.
Let $\iota(\eta(l)) = l$ denoted $l_\eta$. We call $l$ the label of nonterminal $\eta(l)$.
With $\Pi$, $(\forall l \in L | : \eta(l) \in \text{Branch}(\Pi) \Leftrightarrow (\exists l_1, l_2 \in L | : (l, l_1) \in E \wedge (l, l_2) \in E))$.
With $\Pi$, $(\forall l \in L | : \eta(l) \in \text{Merge}(\Pi) \Leftrightarrow (\exists l_1, l_2 \in L | : (l_1, l) \in E \wedge (l_2, l) \in E))$.

$\text{Nonterms}(\Pi) = N.\Pi \cup \text{Branch}(\Pi) \cup \text{Merge}(\Pi)$
Depth-first search of the edges in $E.\Pi$, beginning at each nonterminal label
  $(\cup | n \in \text{Nonterms}(\Pi) | \iota(n))$ and ending at the first encountered nonterminal label
  $(\cup | n \in \text{Branch}(\Pi) \cup \text{Merge}(\Pi) | \iota(n))$, yields all the productions. Each discovered path
  $(\iota(n), t_1, \ldots, t_m, \iota(n'))$, yields a production, $n \to \iota(n) \zeta(t_1) \ldots \zeta(t_m) n'_{\iota(n')}$.
- Define $\text{Paths}(\Pi): n \to \iota(n) \zeta(t_1) \ldots \zeta(t_m) n' \in \text{Paths}(\Pi) \Leftrightarrow (\exists n, n' \in \text{Nonterms}(\Pi),$
$t_0, \ldots, t_{m+1} \in L | : t_0 = \iota(n) \wedge t_{m+1} = \iota(n') \wedge (\forall 0 \leq i \leq m | : (t_i, t_{i+1}) \in E) \wedge (\forall 1 \leq i \leq m | : \eta(t_i) \notin \text{Branch}(\Pi) \cup \text{Merge}(\Pi)))$.
With $\Pi, (\forall l \in L | : l \in \text{Assign}(\Pi) \Leftrightarrow B(l)$ contains an assignment.
- With $\Pi, (\forall l \in L | : l \in \text{Assign}(\Pi) \Leftrightarrow (\text{for}(l, l, n, \rho, \chi) \in B | : (\exists v \in (\rho \cup \chi) | : \text{write}(v) \in I)))$,
  where $\text{write}(v)$ is a statement or instruction that changes the contents of $v$.

FIG. 3

$N.\Pi = \Psi(\Gamma)$
$L.\Pi = T.\Gamma$
$s.\Pi = s.\Gamma$
$E.\Pi = (\cup | n \to t_0 \ldots t_{m+1} \in P.\Gamma | IntraEdges(t_0 \ldots t_{m+1}))$
$C.\Pi = (\cup | n \to t_0 \ldots t_{m+1} \in P.\Gamma | IntraEdges(t_0 \ldots t_{m+1}))$
$B.\Pi = B.\Gamma$
$F.\Gamma = F.\Pi$
$D.\Pi = D.\Gamma$ Let $\Psi(\Gamma) = (\cup | (n, o) \in F.\Gamma | n)$
Let $\alpha(t) = l$ if $t = n^l$ for some $n \in N.\Gamma \wedge l \in T.\Gamma$, otherwise $\alpha(t) = t$ if $t \in T.\Gamma$
Let $\omega(t) = \{(l, \iota(n))\}$ if $t = n_1$ for some $n \in \Psi(\Gamma) \wedge l \in T.\Gamma$, otherwise $\omega(t) = \emptyset$ Let $IntraEdges(t_0 \ldots t_{m+1}) = (\cup | 0 \leq i \leq m | \{(\alpha(t_i), \alpha(t_{i+1}))\})$
Let $IntraEdges(t_0 \ldots t_{m+1}) = (\cup | 0 \leq i \leq m+1 | \omega(t_i))$

FIG. 4

| | Original Source Code | Original Grammar |
|---|---|---|
| 1 | void compute (int sel, len, width) { | $\Gamma = (N, T, S, P)$ |
| 2 | if ( sel == 1) | N = {F,b,G} for (compute, if, square) |
| 3 | area = square ( len, width) | T = {1, 2, 3, 4, 5, 6, 7, 8, 9, 10, 11} |
| 4 | else | P = { F: 1 b 6 |
| 5 | area = pi * radius^2; | G: 7 8 9 10 11 |
| 6 | } | b: 2 G 4 |
| | | b: 2 5 |
| 7 | int square ( int, len, width) { | } |
| 8 | int ret; | S = F |
| 9 | ret = len * width; | Functions = {F, G} |
| 10 | return ret | |
| 11 | } | |

| | New Source Code | Transformed Grammar |
|---|---|---|
| 1 | void compute ( int sel, len, width) { | $\Gamma = (N, T, S, P)$ |
| 2 | if ( sel == 1) { | N = {F,b} for (compute, if) |
| 8 | int ret; | T = { 1, 2, 4, 5, 6, 8, 9, 10 } |
| 9 | ret = len * width; | P = { F: 1 b 6 |
| 10 | area = ret; | b: 2 8 9 10 4 |
| 4 | } else | b: 2 5 |
| 5 | area = pi * radius^2; | } |
| 6 | } | S = F |
| | | Functions = {F} |

US 8,281,290 B2

SOFTWARE DIVERSITY USING CONTEXT-FREE GRAMMAR TRANSFORMATIONS

PRIORITY STATEMENT

This nonprovisional application claims the benefit of priority to U.S. provisional application Ser. No. 60/936,842 filed on Jun. 22, 2007, the entire contents of which are incorporated herein in their entirety.

BACKGROUND

1. Field

Example embodiments are related to methods for restructuring a program, and for example, to methods for restructuring a program using context-free grammar transformations.

2. Background

A personal computer's operating system contains many megabytes of programs that may contain unpublicized, exploitable vulnerabilities. Application programs multiply a size of an exposed code base, and current forms of mobile code now supported by many operating systems and browsers open the vulnerabilities to a wider range of attacks for network-connected systems. As organizations move more and more toward software monocultures where a majority of hosts share some common software identical in both version and patch level the above problems become worse.

Conventional defense strategies include vulnerability scanners, network security bundles (e.g., with firewalls, virus scans, spam blockers, and privacy controls), intrusion detection and intrusion prevention systems, identity management systems, and insider threat management systems. However, effective attacks are still mounted against computer systems employing conventional defense strategies, and security patches are commonplace.

An attack that is successful against one version of a particular program will be successful against all instances of the program having the same version. Recent research has focused on diversity as a method to protect individual hosts and guard against large-scale attacks. Instruction set randomization (ISR) is used within software dynamic translation systems to provide process-specific instruction sets to protect against code injection attacks. N-variant systems, if supplied with program variants with disjoint vulnerabilities, observe the difference in program behavior to detect attacks. Address randomization techniques guard against memory error attacks by randomizing the location of segments (i.e., stack, heap, and code) within process memory space, and by randomizing the order and spacing of stack and heap variables within the segments.

Software diversity has been shown to be a viable method of software defense. Research suggests that the greater the degree of diversity the more effective the defense. Instruction set randomization (ISR) and address randomization techniques automatically create numerous diverse programs. However, all of the instances of a given program have the same code structure, i.e., all the instances of a given program have the same set of functions, and the functions have the same parameters and the same set of stack and heap variables. Instruction set randomization (ISR) depends on a secret key which may be systematically guessed, and address randomization techniques only randomize variable ordering without randomizing a structure of a program.

SUMMARY

Example embodiments may provide a method for restructuring a program using context-free grammar transformations to construct a new program having a different program structure.

According to an example embodiment, a method may include mapping a first program to a context-free grammar. Grammar transformations may be performed on the context-free grammar to produce a transformed context-free grammar representing the first program. A second program having a program structure different than a program structure of the first program may be constructed from the transformed context-free grammar.

According to an example embodiment, a computer readable medium may include a mapping code segment instructing a computer to map a first program to a context-free grammar, a performing code segment instructing a computer to perform grammar transformations on the context-free grammar to produce a transformed context-free grammar representing the first program, and/or a constructing code segment instructing a computer to construct a second program having a program structure different than a program structure of the first program from the context-free grammar.

BRIEF DESCRIPTION OF THE DRAWINGS

The above and/or other aspects and advantages will become more apparent and more readily appreciated from the following detailed description of example embodiments taken in conjunction with the accompanying drawings of which:

FIG. 2 shows an induction function for a process of inducing a context-free grammar from a control-flow graph;

FIG. 3 shows a deduction function for a process of deducing a control-flow graph from a context-free grammar;

FIG. 4 shows an original source code, an original grammar, a transformed grammar, and new source code for an example program during a method for restructuring a program according to an example embodiment;

DETAILED DESCRIPTION OF EXAMPLE EMBODIMENTS

Figure 1:
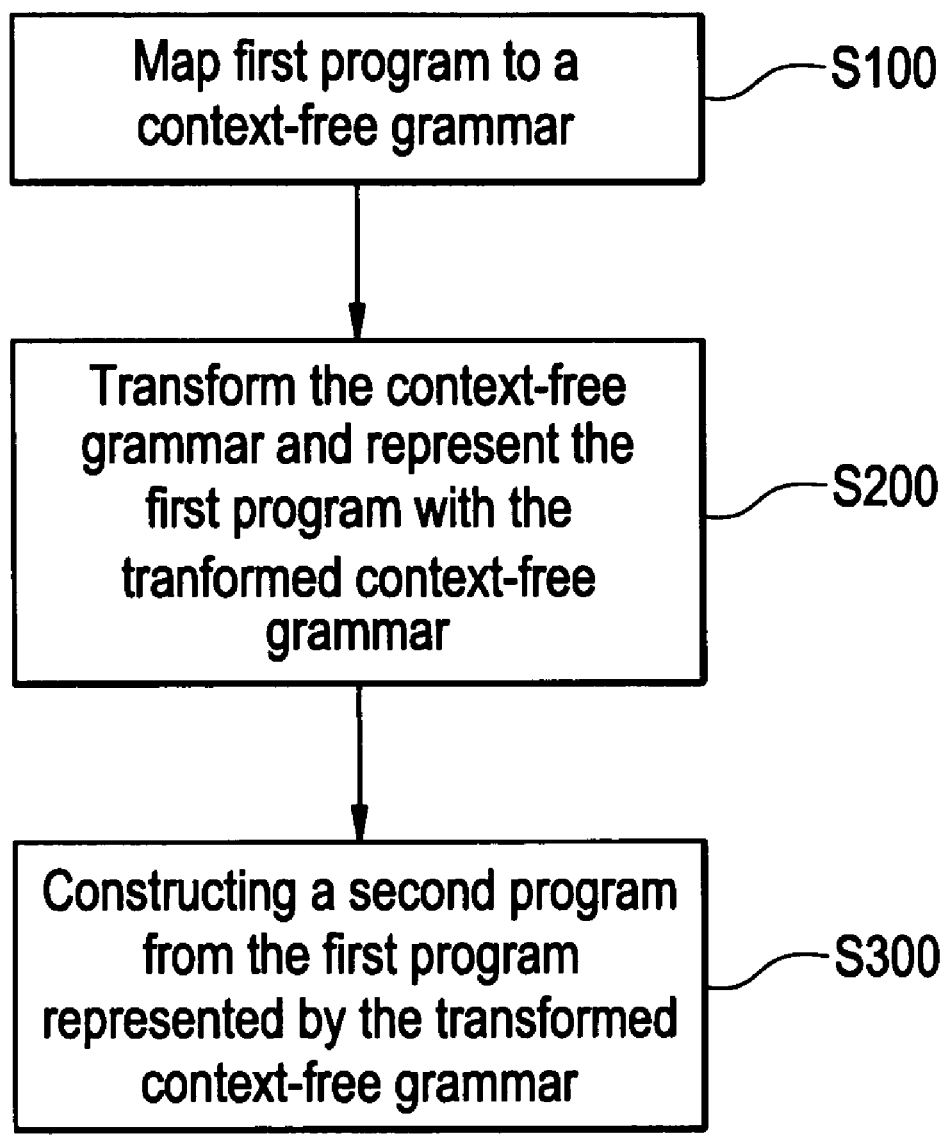
FIG. 1 shows a flow chart illustrating a method for restructuring a program according to an example embodiment.

Example embodiments will now be described more fully hereinafter with reference to the accompanying drawings. Embodiments may, however, be in many different forms and should not be construed as being limited to the example embodiments set forth herein. Rather, these example embodiments are provided so that this disclosure will be thorough and complete, and will fully convey the scope to those skilled in the art.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. This, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

A change in program structure may rearrange code and memory in ways that render attacks, e.g., memory error attacks, ineffective. Program structure may be a set of functions and/or the distribution of function parameters, stack variables, and/or heap variables across the set of functions. A program may include original code. For example, the program may include source code, executable code, object code, or any code based on a context-free grammar. Context-free grammars may be used to specify the syntax of programming languages, and context-free grammars may be converted into different forms, e.g., Chomsky Normal Form and Greibach Normal Form. Context-free grammars may be used to represent program structure. For example, context-free grammars may be used to specify the syntax of procedural programming languages like C and Java. If a developer chooses control structures for a program, the developer may effectively choose productions in the grammar that specify the syntax of the language. The developer's choices determine the structure of the program and/or the program's control flow. Because the control flow is determined by a grammar, a grammar may be induced from the control-flow. For an induced grammar in a software diversity algorithm there may be one nonterminal for each function and each control structure and one terminal for each program statement. Only a subset of the statements, called $\tau$-statements, in the program that actually alter the state of the program, need be performed in a same sequence in all transformed program instances.

A context free grammar may be induced from a program. For example, a context-free grammar may be induced from a program that may be fully disassembled, e.g., all branch targets may be identified as the branch targets affect grammar induction and transformation. For example, branch targets may indicate a start of a new nonterminal. Disassembly need not require decompiling back into source code, but merely disassembly into assembly language, i.e., determining the set of machine language instructions that comprise the program. The original code of the program may be mapped to a context-free grammar, e.g., somewhat similar to diagramming a sentence. For example, a control-flow graph of the program may be constructed from the original code (e.g., from the program's executable code), and a context-free grammar may be induced from the control-flow graph. Construction of a control-flow graph from the original code of a program, and the induction of context-free grammar from the control-flow graph will described below in detail with reference to FIGS. 2-3, and 5.

A context-free grammar may be an N-tuple. For example, a context free grammar may be a 4-tuple or an 8-tuple. Example embodiments are described below in regards to a context-free grammar as a 4-tuple and a 8-tuple for ease of description; however, example embodiments are not limited thereto and a context-free grammar according to example embodiments may be any N-tuple.

According to an example embodiment, a context-free grammar may be a 4-tuple $\Gamma=(N, T, S, P)$, where N is a set of nonterminals, T is a set of terminals, $S \in N$ is an initial nonterminal, and a set of productions, P, is a relation from nonterminals to strings of terminals and nonterminals. Each production is of the form $A \rightarrow \beta$, where A is a nonterminal and $\beta$ is a possibly empty string of terminals and nonterminals. According to an example embodiment, a program context-free grammar may be a 4-tuple $\Gamma=(N, T, S, P)$, where N is a set of control elements (e.g., functions and control structures), T is a set of statements, $S \in N$ is the main function, and P is a relation from control elements to strings of statements and control elements. Each element of P may specify execution sequences, and each P is of the form $A \rightarrow \beta$ where A is a control element and $\beta$ is a string of statements and control elements.

According to another example embodiment, a program context-free grammar may be an 8-tuple $\Gamma=(N, T, s, P, F, B, D, \tau)$, where N is a set of control elements (e.g., functions and control structures), T is a set of terminals (e.g., program statements), $S \in N$ is an initial nonterminal, and a P is a set of productions including a relation from nonterminals to strings of terminals and nonterminals. Each production is of the form $A \rightarrow \beta$, where A is a nonterminal and $\beta$ is a possibly empty string of terminals and nonterminals. $F \subset N \times T$ is the set of function nonterminals. For $(n,o) \in F$, n is the function's name, and o is the label of the function's initial block. B is a set of blocks, where for $(l,I,n,\rho,\chi) \in B$, $l \in T$ is the block label, I is the set of instructions in the block, $n \in N \cup \{\epsilon\}$ is the name of the function called or the empty string, and $\rho$ and $\chi$ are the set of parameters and variables accessed in the block respectively. D is the distribution of parameters and variables across the functions. For $(n,R,V) \in D, n \in F$ is the function's name, R is the set function parameters, and V is the set of variables declared in the function. $\tau \subset T$ is the set of terminals which represent the state-changing statements of the program. A statement is said to be state-changing if it modifies a variable.

FIG. 1 illustrates an example of a method for restructuring a program according to an example embodiment. It will be understood that example embodiments of the method as illustrated in FIG. 1 may be implemented, for example, in the form of instructions stored on a computer readable medium (e.g., a memory, cd-rom, etc.), which may be executed using any suitable computer platform. As shown in FIG. 1, at step (S100), a first program may be mapped to a context free grammar. Grammar transformations may be performed on the context-free grammar, and the first program may be represented with the transformed context-free grammar at step (S200). A second program having a program structure different than a program structure of the first program may be constructed from the first program represented by the transformed context-free grammar (S300). A method for restructuring a program according to an example embodiment will be discussed in more detail below with regard to FIGS. 4-5.

A control-flow graph may specify execution paths within a program. The control-flow graph may be partitioned into sub-graphs with one sub-graph for each function specifying the intra-procedural, i.e., intra-function, control flow for each function. Blocks or statements of a program may be labeled, and/or the control-flow graph may be specified over the labels. A table may be maintained to associate the labels with the program blocks. Information about the functions' variables and parameters may be maintained, and/or control flow between functions may be maintained. For example, control flow between functions may be maintained by keeping the function call information within the block table, by incorporating the function call into the control-flow graph, or by generating a separate graph. For example, a control-flow graph may an 8-tuple $\Pi=(N,L,s,E,C,B,F,D)$, where N is the set of function names within the program, L is a set of block labels, $s \in N$ is the initial function, $E \subset L \times L$ is the intra-function control-flow, $C \subset L \times L$ is the inter-function control-flow, B is a set of blocks, where for $(l,I,n,\rho,\chi) \in B$, l is the block label, I is the set if instructions in the block, $n \in N \cup \{\epsilon\}$ is the name of the function called, if any, or n is the empty string, and $\rho$ and $\chi$ are the set of parameters and variables accessed in the block respectively, $F \subset N \times L$ is the set of function initial points. For $(n,o) \in F$, n is the function's name, and o is the label of the function's initial block. D is the distribution of parameters and variables across the functions, where for $(n,R,V) \in D$, $n \in N$ is the function's name, R is the set of function parameters, and V is the set of local function variables. However, example embodiments are not limited thereto, and a control flow graph may be any N-tuple. For example, examples embodiments are described below in regard to a 4-tuple control-flow graph for ease of description.

The context-free grammar $\Gamma=(N, T, s, P, F, B, D, \tau)$ described above may be induced from a control-flow graph $\Pi=(N, L, s, E, C, B, F, D)$ described above based on the induction function illustrated in FIG. 2. The nonterminals of the context-free grammar may include the names of the functions and unique names uniquely assigned and generated for each branch point and each merge point within the grammar. The points are chosen at a beginning of nonterminals because they are either the starting points of control structures or the starting points of the statements between control structures. The productions may be derived by following the paths from each nonterminal position to the first nonterminal position encountered. Therefore, the productions may contain multiple nonterminal uses for function calls, but only one nonterminal use for non-function calls. The nonterminal use may always be at the end of the production.

Strings generated by program grammar may be expressed only in terms of a subset of the terminals of the grammar, called τ-terminals. If all other terminals in the grammar are considered to be other names for empty symbols, the strings generated by the grammar may only contain τ-terminals. Accordingly, the strings or execution sequences generated by the grammar and a transformation of the grammar may be identical. The τ-terminals may correspond to the blocks that contain a write/read of a program variable. The remaining components of the context-free grammar may be simply carried over from the control-flow graph. For example, a finite state machine with a stack may represent the context-free grammar. A string generated by the context-free grammar may be a sequence of τ-terminals, and if the sequence of τ-terminals are fed to the finite state machine with the stack, the finite state machine may transition from a starting state to an accepting state. Accordingly, non τ-terminals may act as empty symbols in the finite state machine. However, example embodiments are not limited thereto and the finite state machine may have a heap or another element in a memory space.

Alternatively, the control-flow graph $\Pi=(N, L, s, E, C, B, F, D)$ may be deduced from the context-free grammar $\Gamma=(N, T, s, P, F, B, D, \tau)$ based on the deduction function illustrated in FIG. 3. A right hand side of each production in FIG. 3 may contain a string of elements that are either an ordered pair (l,n), denoted by $n_l$, or a label l. Ordered pairs represent the use of a nonterminal. For control-flow graph deduction, the function names are the names of the grammar's function non-terminals. The inter-procedural or inter-function edges are derived from ordered pairs whose nonterminal is a function nonterminal. For the edge (l,i(n)), l is the block label where the function call is made and i(n) is the initial label of the function n. The intra-procedural or intra-function edges are derived by creating edges from terminal labels that are consecutive in production. All other components are carry-overs from the context-free grammar. The control-flow graph deduction algorithm may assume that the grammar productions are in the same form created by the context-free grammar induction function where there is at most one use of a nonterminal other than for function call, and the use occurs at the end of the production.

For illustration purposes, the method illustrated in FIG. 1 is described below with reference to the source code of the "Simple" computer program illustrated in FIGS. 4-5. However, it will be understood that example embodiments may be used in connection with any computer program, including much more complex computer programs.

In a context-free grammar, each function and each control structure may be represented by a nonterminal, and/or each individual atomic statement of the program may be represented by a terminal. However, only a subset of the nonterminals may represent functions, i.e., function nonterminals.

Figure 5:
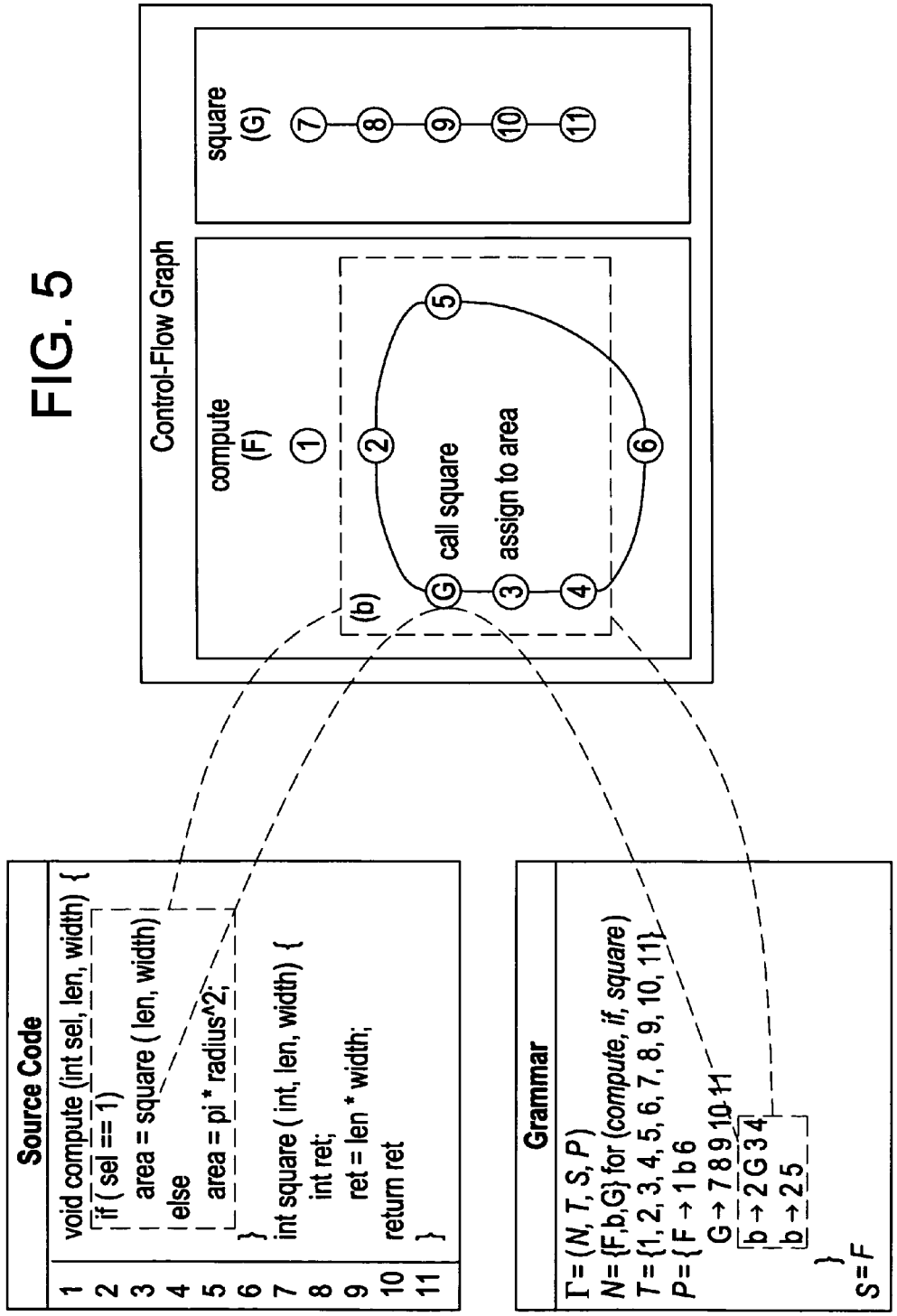
FIG. 5 illustrates a control-flow graph for the example program shown in FIG. 2 and a relationship between the original source code and the original grammar shown in FIG. 2.

Referring to FIGS. 4-5, the original source code of a program may be mapped to an original context-free grammar. Example embodiments are described with reference to 4-tuple context-free grammars for ease of description, however, example embodiments are not limited thereto.

Functions void compute and int square of the original source code may be represented as nonterminals F and G, respectively, and the if/else statement of the original source code, which is a control element, may be represented by a nonterminal b. Each line of functional source code, e.g., the lines of source code except for blank lines or comments, may be represented by terminals 1 through 11, respectively. The function nonterminal F may be the initial nonterminal S. Productions P for each nonterminal, e.g., relations from functions or control elements to strings of statements, control elements, and/or functions, may be F→1 b 6, G→7 8 9 10 11, b→2 G 4, and/or B→2 5 as illustrated in FIG. 4. For example, the original source code of the program may be mapped to the original context-free grammar based on the control-flow graph illustrated in FIG. 5.

The original source code for the function int square may include source code lines 7 through 11. As illustrated in the control-flow graph of FIG. 5, the nonterminal G, which is mapped to the function int square, may include the terminals 7 through 11, which may correspond to the source code lines 7 through 11. The nonterminal F, which is mapped to the function void compute, may include terminals 1 and 2 and a branch as illustrated in the control-flow graph of FIG. 5. The branch may be due to the control element representing the if/else statement at lines 2 and 4 of the original source code. The control-flow graph for the function nonterminal F may branch to either call function G or to terminal 5 after terminal 2. For example, the original source code after line 2 may either call the square function, which is represented by nonterminal G, as a part of the assignment at line 3 or perform the assignment at line 5. The control element representing the if/else statement of the original source code may be represented by the nonterminal b. Accordingly, a production P corresponding to the function nonterminal F may be F→1 b 6. Because the nonterminal b includes the left and right branches, productions P corresponding to the nonterminal b may be b→2 G 4 and b→2 5. The assignment 3 may be omitted from the original grammar, e.g., as illustrated in FIG. 4 at b→2 G 4, but the assignment 3 is implicit therein, for example as shown in the control-flow graph illustrated at FIG. 5.

Accordingly, a production P for the function F may be represented in the original context-free grammar by F→1 b 6, wherein the terminals 2 through 5 are instead represented by the nonterminal b.

Referring to FIG. 4, the original context-free grammar may be transformed and the program may be represented by the transformed context-free grammar.

For example, the function nonterminal G may be replaced with the τ-terminals 8, 9, and 10, and the functional nonterminal G may be removed. Accordingly, the set function nonterminals may be reduced to include only the function F. The terminals 3, 5, 8, and 9 in FIGS. 4-5 may be τ-terminals. The terminals 1, 2, 4, 6, 7, 10, and 11 in FIGS. 4-5 may not be τ-terminals.

Referring again to FIG. 4, new source code for a second program may be constructed from the first program represented by the transformed context-free grammar. Therefore, the second program may not include the function int square as illustrated at FIG. 2. Instead, the calls to the function int square are replaced with the corresponding source code lines represented by the corresponding terminals, e.g., terminals 8, 9, and 10, in the transformed context-free grammar. Accordingly, the new source code may include a different set of functions than the original source code and/or the variable and parameter distribution of the new source code may be different than the variable and parameter distribution of the original source. However, the new source code and the original source code may still operate the same, e.g., the new source code and the original source code may still produce the same results.

Example embodiments described above with reference to FIGS. 4-5 are described in relation to a grammar transformation employing inlining for ease of description. Inlining may choose a function nonterminal and remove the chosen function nonterminal from the set of functions. If constructing a program from the transformed grammar, wherever the chosen nonterminal appeared in the grammar as a function call, the function nonterminal may be treated as a control structure. A similar concept is outlining where a contiguous block of text may be converted into a function, e.g., in grammar terms a string in a production may be replaced with a fresh function nonterminal. However, grammar transformations according to example embodiments are not limited thereto and allow for much more complex restructuring of a program than inlining and outlining. For example, any grammar transformation may be used for code restructuring according to example embodiments.

For example, grammar transformations may cross control-structure boundaries, and abstraction to a context-free grammar may naturally separate certain control elements, e.g., as with the nonterminal b illustrated in FIG. 1 where the then and else branches of the if-statement are separated. Grammar transformations may affect non-contiguous sequences of instructions, and/or elements of control structures may be separated. For example, if a function has two branches of execution, a left branch may be inlined, but a function call may be continued to be made for a right branch. If a function is split into left and right branches, variables of the function may be redistributed according to the variable usage of the two branches. There is no "loop" control element in grammar, only recursion. Accordingly, if a grammar is converted to source code, the new source code may not include any of the loop control elements of an original source code. Instead, the new source code may include recursive function calls.

Figure 6:
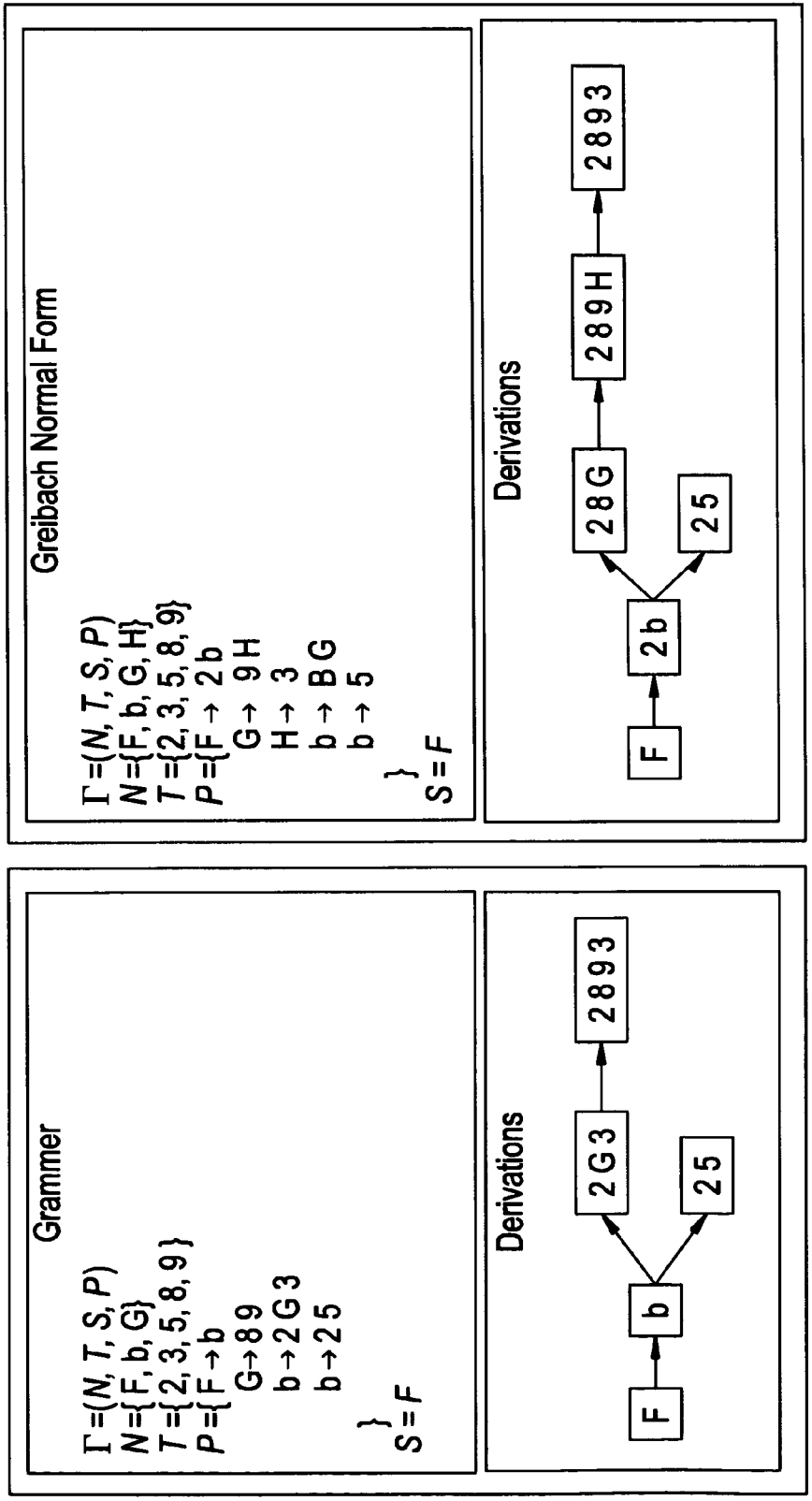
FIG. 6 illustrates another type of grammar transformation according to another example embodiment.

FIG. 6 illustrates another type of grammar transformation according to an example embodiment. For illustration purposes, the steps as illustrated in FIG. 6 are described with reference to the "Simple" program grammar representing another "Simple" computer program. However, it will be understood that example embodiments may be used in connection with any grammar representing any program, including much more complex grammars and/or computer programs.

Referring to FIG. 6, an original program grammar may be transformed into a Greibach Normal Form grammar. The left side of FIG. 6 illustrates a context-free grammar for a computer program along with a derivation tree representative thereof. The derivation tree includes steps connected by edges. Each step past the first step, which contains only "F," may be derived by replacing a nonterminal with the right hand side of a production of said nonterminal. For example, "F" is replaced with "b" because "F→b" is a production in the grammar. The right hand side of FIG. 6 illustrates the Greibach Normal Form of the grammar for the computer program illustrated on the left hand side. The right hand side also illustrates a derivation tree based on the Greibach Normal Form of the grammar. Because the last steps (or leaves) of the derivation trees are the same, the two grammars for the program may be said to generate the same language, e.g., the two grammars for the program may represent the same behavior. However, the program represented by the grammar illustrated on the left hand side may have a different set of functions than the program represented by the Greibach Normal Form of the grammar on the right hand side.

Accordingly, context-free grammar transformations may be used to modify a context free grammar specifying a syntax of a programming language. Therefore, a program written in a language may be parsed by a certain class of parser. For example, left recursion may need to be removed from a context free grammar to admit parsing by an LL(k) parser. The transformation may yield a new set of nonterminals without altering the syntax of the language, e.g., a new set of functions with unaltered program functionality. For example, any original grammar may be transformed to normal forms.

Operational parameters may direct example embodiments to favor certain types of transformations. Accordingly, the type transformation performed on an original context-free grammar may be based on the operational parameters of the original source code. For example, a type of transformation used may be based on a program's code structure and variable usage.

A method for code restructuring according to example embodiments may be applied to the software installed on each host in a network, and need be applied only once to each host. Therefore, each installation of the software may be made unique with respect to code structure. However, example embodiments are not limited thereto, and a method according to example embodiments may be applied to a program after each use, thereby producing a unique instance of the program for each invocation of the program. Each new instance of a program may operate and function the same as the original.

Accordingly, example embodiments may be effective against attacks, e.g., assumptions made by exploits using memory error attacks may be invalidated. For example, if a worm attacks a network of computers, the worm may gain access to a first host via a buffer-overflow attack. Operating system and microprocessor manufacturers have implemented a conventional solution to the type of buffer-overflow that is used in code injection attacks. The conventional solution may attempt to prevent the code injected into the program stack from being run because the program stack may be located in a segment of memory marked as non-executable. However, the conventional solution does not prevent the buffer-overflow itself, but rather attempts to prevent the execution of the injected code. Buffer-overflow, however, need not involve code injection, and may involve variable overwriting. If the worm attempts to propagate to a next host, the worm may fail because code restructuring according to an example embodiment has been applied to the next host. Therefore, the buffer and control variable may not be in the same function in the next host, and therefore, the worm may not be able to overwrite the control variable. As such, the worm may continue to attack each host in the system, but the worm may be successful only on the relatively very small percentage of hosts where the two variables are present in the same function and located in the necessary order. The example described above uses stack variables, but example embodiments are not limited thereto and the variables may be heap variables.

Code restructuring according to example embodiments may allow software to be distributed via conventional means, e.g., all distributed copies may be identical, because diversity is introduced at installation time and/or at runtime. The number of unique instances of a program that may be generated is relatively large, e.g., far in excess of the number of copies of a program in even the largest-scale known systems. A "footprint," e.g., processing, storage, and memory requirements on a host, required by a program for implementing code restructuring according to example embodiments may be independent of the number of hosts in the system as well as of the number of network links among the hosts and the network bandwidth. Therefore, a program for code restructuring according to example embodiments may "scale" as a constant with respect to the number of hosts, the number of network links, and/or the network bandwidth. A user interface for a program for code restructuring according to example embodiments may only require invoking the program for code restructuring with a name of a program to be transformed.

Accordingly, example embodiments may create programs having diverse program structures. New instances of programs may have a different set of functions, e.g., different functions and/or a different number of functions, and/or the parameters of the functions may vary from the parameters of an original program. The functions may vary with respect to stack and heap variables created by the programs. Example embodiments may employ a language-theoretic approach that may induce a context-free grammar from a program, perform random transformations on the context-free grammar, and/or construct a new program from the transformed context-free grammar.

Accordingly, example embodiments may produce variants of a vulnerable program that are not vulnerable to attacks that depend on program structure, variable location, or relative variable ordering.

Example embodiments have been described with regard to source code of a computer program (e.g., the "Simple" computer program). However, it will be understood that example embodiments may be applied to object code, for example, executable (.exe) files, etc.

Although example embodiments have been shown and described in this specification and figures, it would be appreciated by those skilled in the art that changes may be made to the illustrated and/or described example embodiments without departing from their principles and spirit.

What is claimed:

1. A method comprising:
mapping, by a computing platform, a first program to a context-free grammar, the context free grammar being at least a 4-tuple grammar and induced from a control-flow graph;
performing, by the computing platform, grammar transformations on the context-free grammar to produce a transformed context-free grammar representing the first program, the transformed context free grammar being at least a 4-tuple grammar, the transformed context free grammar including separating function parameters and variables; and
constructing, by the computing platform, a second program having a program structure different than a program structure of the first program from the transformed context-free grammar.

2. The method of claim 1, wherein a set of functions of the second program is different than a set of functions of the first program.

3. The method of claim 2, wherein a distribution of function parameters, stack variables, and heap variables across the set of functions of the second program is different than a distribution of function parameters, stack variables, and heap variables across the set of functions of the first program.

4. The method of claim 2, wherein the set of functions of the second program includes one of (i) more functions than the set of functions in the first program, and (ii) less functions than the set of functions in the first program.

5. The method of claim 1, wherein the context free grammar is at least a 4 tuple=(N, T, S, P), where N is a set of control elements including functions and control structures, T is a set of program statements, S.di-elect cons.N is a main function, and P is a relation from the control elements to strings of the program statements and the control elements, and wherein P includes a plurality of elements specifying execution sequences, and each element in P is of the form A.fwdarw..beta. where A is a control element and P is a string of the program statements and the control elements.

6. The method of claim 5, wherein the performing grammar transformations on the context-free grammar includes separating at least one of function parameters and variables of the control elements.

7. The method of claim 1, wherein the context-free grammar is at least an 8-tuple .GAMMA.=(N, T, s, P, F, B, D, .tau.), where N is a set of control elements including functions and control structures, T is a set of program statements, S.di-elect cons.N is a main function, and a P is a relation from the control elements to strings of the program statements and the control elements, and wherein each production in P is of the form A.fwdarw..beta. where A is a control element and .beta. is a possibly empty string of the program statements and the control elements, and wherein F.OR right.N.times.T is a set of function control elements, wherein for (n,o).di-elect cons.F,n is the function's name, and o is the label of the function's initial block, and wherein B is a set of blocks, where for (l,I,n,.rho.,.chi.).di-elect cons.B,l.di-elect cons.T is a block label, I is a set of instructions in the block, n.di-elect cons.N.orgate.{.epsilon.} is at least one of the name of a function called and an empty string, and .rho. and .chi. are a set of parameters and variables respectively accessed in the block, and wherein D is the distribution of the parameters and the variables across the functions, and wherein for (n,R,V).di-elect cons.D,n.di-elect cons.F is the function's name, R is a set function parameters, and V is a set of variables declared in the function, and wherein .tau..OR right.T is a set of program statements which represent the state-changing statement of the first program.

8. The method of claim 7, wherein the performing grammar transformations on the context-free grammar includes separating at least one of the function parameters and the variables of the at least one of the control elements.

9. The method of claim 1, wherein a syntax of a language of the first program is the same as a syntax of a language of the second program.

10. The method of claim 1, wherein a type of grammar transformation performed on the context-free grammar is based on a code structure and variable usage of the first program.

11. The method of claim 10, wherein the type of grammar transformation performed on the context-free grammar is a transformation of the context-free grammar to a normal form of the context-free grammar.

12. The method of claim 1, wherein the mapping the first program to the context-free grammar includes generating a control-flow graph based on the first program and the context-free grammar.

13. A non-transitory computer readable medium having computer instruction code embedded thereon, the computer instruction code comprising:
   a mapping code segment instructing a computer to map a first program to a context-free grammar, the context free grammar being at least a 4-tuple grammar and induced from a control flow graph;
   a performing code segment instructing a computer to perform grammar transformations on the context-free grammar to produce a transformed context-free grammar representing the first program, the transformed context free grammar being at least a 4-tuple grammar, the transformed context free grammar including separating function parameters and variables; and
   a constructing code segment instructing a computer to construct a second program having a program structure different than a program structure of the first program from the transformed context-free grammar.

\* \* \* \* \*